March 13, 1934.   W. J. BRENNEN   1,950,780
CONTROL SYSTEM
Filed March 13, 1931
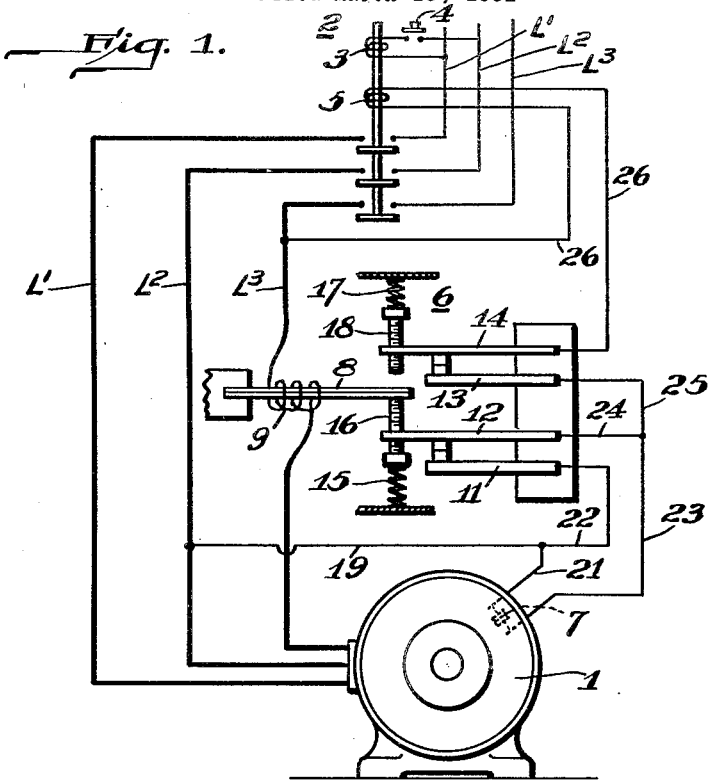
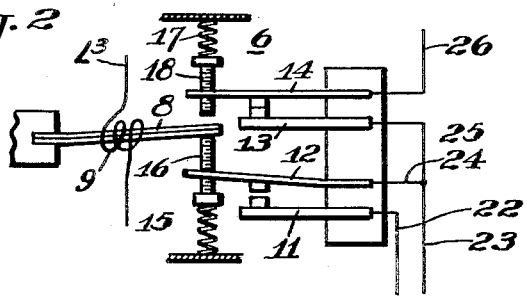
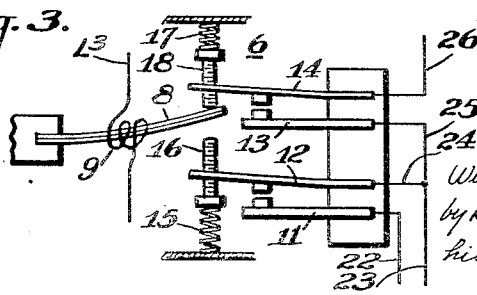
WITNESSES
A. B. Wallace
J. E. Dickinson
INVENTOR
William J. Brennen
by Brown & Critchlow
his Attorneys Patented Mar. 13, 1934

1,950,780

UNITED STATES PATENT OFFICE 1,950,780

CONTROL SYSTEM

William J. Brennen, Scottdale, Pa.

Application March 13, 1931, Serial No. 522,255

8 Claims. (Cl. 175—294)

This invention relates to a system of control for protecting electric motors and translating devices of that character against injury from overloads and overheating.

A difficulty common to control systems of this nature, as heretofore practiced, is that where provision is made for stopping a motor in response to its temperature exceeding a predetermined value it is impossible to conveniently restart or reoperate it again until after it has cooled down to a temperature equal to or below that at which the temperature responsive means employed to open its operating circuit is adapted to reclose. The temperature responsive means customarily used for such purpose is usually located within the motor in such a way that its cooling takes place directly as that of the motor. Consequently, it usually requires considerable time, depending upon the size of the motor and its ability to get rid of its heat, before it can be conveniently restarted or reoperated.

For many uses to which motors are put, such for example as in mass production systems where a number of devices are operated by a single motor, continued or indefinite stops of the nature referred to are very undesirable and disadvantageous. For example, in many such systems it is frequently necessary to unload the power line to which the motor is coupled, for various reasons, before allowing it to stand idle for any length of time, or to complete an operation without undue delay, which is started before the motor is stopped by its protective system. Furthermore, it is desirable to be able not only to conveniently move a motor so stopped out from under a load, but to also be able to operate it without load to assist in cooling it off, as such devices can usually be cooled off much faster when operated without load than they can by just allowing them to sit still.

In view of such difficulties it is the primary object of this invention to provide an improved control system for protecting electric motors and the like against injury from overloading and overheating, and especially the latter, in which provision is made for restarting and operating the motor for short periods under load, or under no load for cooling purposes at the will of the operator, without any appreciable delay after the motor is stopped as a result of overheating.

A further object is to provide a protective system of the nature referred to which is not only free of the aforementioned difficulties, but is both simple of construction and comparatively inexpensive to manufacture, as well as dependable in operation and easy to install.

These and other objects, as well as the various other novel features and advantages of the invention will become apparent when the following detailed description is read in conjunction with the accompanying drawing, wherein Fig. 1 is a schematic diagram of a single embodiment of the invention, and Figs. 2 and 3 views respectively of the load responsive relay employed in the system illustrating it in various positions it assumes under different conditions of operation.

Referring now, in detail, to the drawing a motor 1 with which the invention is to be used is shown connected in a common fashion through a gravity opened circuit breaker 2 with a three phase source of power, supplied by line conductors $L_1$, $L_2$ and $L_3$. For closing this breaker an actuating coil 3 is provided and connected through a normally open push button 4 with line conductors $L_1$ and $L_2$. In addition to this coil another coil 5 is arranged on breaker 2 for holding the breaker closed after push button 4 is allowed to open. This latter coil is connected in a circuit extending from line conductor $L_2$ to $L_3$ on the motor side of breaker 2 through itself, a load responsive relay, indicated generally at 6, and a thermostatic switch 7, mounted within the motor 1. Consequently, with these devices closed, as they are under normal conditions, as soon as breaker 2 is closed a holding circuit for it is provided through coil 5.

While various forms of thermostatic switch and load responsive devices may be utilized in the breaker holding circuit in accordance with this invention, the thermostat illustrated and described in the inventor's earlier Patent No. 1,782,458, granted November 25, 1930 is recommended because of its simplicity of construction and dependability and high sensitivity of operation. In the load responsive relay illustrated a bimetallic thermal element 8 having a relatively small operating time lag or quick cooling and heating characteristics, is employed and formed of any suitable material, and so mounted that its free end will be flexed in proportion to the temperature conditions surrounding it. In order that it may be responsive to the load imposed upon the motor, a heating coil or grid 9 is arranged adjacent to element 8 and connected in circuit relation with line conductor $L_3$ leading to the motor. Whereby, it is heated in direct proportion to the current drawn by the motor.

Adjacent to the free end of thermal element 8 and in positions to be operated by it there are arranged two pairs of suitably mounted cooperating contact members 11 and 12, and 13 and 14. The lower pair of these contact members, as arranged here, are normally held closed by the thermal element 8 but constantly urged apart by a spring 15 disposed to bear against an adjusting screw 16 mounted in the free end of member 12. The upper pair, in a similar fashion, are normally held closed by a spring 17 which bears against an adjustment screw 18 mounted in the free end of contact member 14. As will be readily appreciated, in place of springs 15 and 17 the contact members 12 and 14 may be made of spring material and flexed to attain the same results.

In accordance with the invention the holding circuit for breaker 2 is traced from line conductor $L_2$ on the motor side of the breaker by way of conductor 19 and conductors 21 and 22, respectively, to the thermostatic switch 7, and the lower relay contact members 11 and 12, respectively. From these the circuit is further traced through a pair of conductors 23 and 24, respectively, to a conductor 25 that is connected to the upper contact members 13 and 14 of the relay, which in turn are connected by a conductor 26 through coil 5 to line conductor $L_3$.

With this arrangement switch 7 and the lower contact members 11 and 12 of the load responsive relay are connected in parallel circuit relation with each other, and both in series circuit relation with the upper contact members of the relay. Accordingly, either contact members 13 and 14 or both switch 7 and contact members 11 and 12 must be open to break the holding circuit.

When adjusting the apparatus for operation, set screw 16 is set to permit members 11 and 12 to open as soon as a light load or load of any appreciable value is placed upon the motor. Screw 18 is set to cause the contact members 13 and 14 to be opened by element 8 when the motor is subjected to a severe overload, short circuit, blocked or the like while switch 7 is adapted to permit varying loads being imposed upon the motor so long as it is not heated up above a safe operating value.

In normal operation of the system, as soon as breaker 2 is closed coil 9 starts to heat up. As a result of this, if a load is imposed upon the motor exceeding that at which the lower contact members 11 and 12 are set to open, the heating of the coil 9, which is completed in a relatively little time after the circuit through the motor is established, will cause thermal element 8 to move away from screw 16, permitting these contact members to open. Under safe load conditions the thermal element 8 will assume some such position as that indicated in Fig. 2.

As soon as contact members 11 and 12 of relay 6 open, the holding circuit for coil 5 is dependent for its maintenance entirely upon thermostatic switch 7, and the overload contact members 13 and 14 of the relay. Consequently, if the temperature of the motor rises above a safe value determined by the setting of switch 7, the latter will open and break the holding circuit allowing breaker 2 to fall open and stop the motor. In a similar fashion, if a severe overload occurs on the motor, element 8 is flexed upwardly, opening the contact members 13 and 14 and the holding circuit. Hence as switch 7 protects the motor against excess heating, relay 6 protects it against severe overloads and excess current flow, and, in addition, by reason of contact members 11 and 12 and their arrangements, affords restarting without substantial delay and light load operation of the motor while overheated.

With the opening of the holding circuit and falling out of the circuit breaker the heating coil 9 is deenergized, and as a result thereof the thermal element 8, which has very little mass, cools relatively quickly and returns to its normal initial position. In such position it closes contact members 11 and 12. Consequently, as soon as this takes place, in spite of the fact that switch 7 may remain open for some time if the motor is overheated, the holding circuit may be reestablished by closing breaker 2, and due to the small time delay required to operate the thermal element 8, the motor may be operated sufficiently long enough to move it out from under a load without any appreciable delay; at least such may be done in successive operation of the thermal element without any great delay. In addition with set screw 16, set to prevent opening of contact members 11 and 12 at no load, the motor may be restarted before switch 7 closes and operated continuously without a load on it to aid in cooling it off.

The advantages of the invention hereinbefore recited will be readily appreciated by those skilled in the art, as well as its applicability to other types of translating devices which are intended to be included in the interpretation of the appended claims.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A system of control comprising a motor, a power circuit for operating said motor, a circuit breaker for opening said power circuit, a holding circuit for said circuit breaker, a load responsive relay having a relatively short operating time lag arranged in said holding circuit and adapted to open when the load on the motor exceeds a predetermined value, and a thermostatic switch connected in said holding circuit in parallel circuit relation with said relay and adapted to open when the temperature of the motor exceeds a predetermined value.

2. A system of control comprising a motor, a power circuit for operating said motor, a circuit breaker for opening said power circuit, a holding circuit for said circuit breaker, a thermostatic switch connected in said holding circuit and arranged to be responsive to the temperature conditions maintaining in the motor, and a load responsive relay having a relatively short operating time lag connected in said holding circuit and arranged to be operated by the load imposed upon said motor, said relay having one set of contact members connected in shunt circuit relation with said switch, and another set in series and adapted to open said first-mentioned sets of contacts when the load on the motor exceeds one value and to open the second-mentioned contacts when it exceeds another.

3. A motor control system comprising an electric motor having a source of current supply connected thereto, means for making and breaking the circuit connections to said motor, means for closing said circuit making and breaking means, means having a short operating time lag adapted to be responsive to the load upon the motor for controlling the opening of said circuit breaking means, when the load on the motor exceeds a predetermined value, and temperature responsive means arranged to be actuated by the temperature in the motor for opening said circuit breaking means, when the temperature of the motor exceeds a predetermined value, said temperature responsive means being adapted to open the circuit breaking means only after said load responsive means has been opened or operated to its circuit breaker opening position but so constructed as to permit the circuit breaking means being reclosed and the motor restarted as soon as said load responsive means is returned to operative position for holding said circuit breaker closed.

4. A motor control system comprising an electric motor having a source of current supply connected thereto, means for breaking the circuit connections to said motor, temperature responsive means arranged to be actuated by the temperature conditions in the motor for controlling the operation of said circuit breaking means, and means arranged to be responsive to the load imposed upon said motor for both rendering the operations of said temperature responsive means ineffective to control the operation of said circuit breaker under certain preselected conditions of operation and positively opening said circuit breaking means to open the motor circuit when the load on the motor exceeds a predetermined value.

5. A motor control system comprising an electric motor having a source of current supply connected thereto, an electro-responsive circuit breaker arranged in said motor current supply connections, a holding circuit for said circuit breaker, a thermostatic switch connected in said holding circuit and arranged to be responsive to the temperature conditions maintaining in said motor, and a relay arranged in said holding circuit in parallel circuit relation with said thermostatic switch, said relay including means responsive to the load imposed upon the motor for automatically affecting its operation.

6. A motor control system comprising an electric motor, a source of current supply for said motor, an electro-responsive circuit breaker for interrupting the current supply to the motor, a circuit for holding said circuit breaker closed, a thermostatic switch disposed in said holding circuit and arranged to be responsive to the temperature conditions maintaining inside of said motor, and a load responsive relay having a relatively small operating time lag as compared to that of the thermostatic switch arranged in said holding circuit in shunt circuit relation with said thermostatic switch for rendering the operation of the thermostatic switch ineffective to control the operation of the circuit breaker until the load upon the motor exceeds a predetermined limit.

7. A motor control system comprising an electric motor, a source of current supply for said motor an electro-responsive circuit breaker for interrupting the current supply to the motor, a circuit for holding said circuit breaker closed, a thermostatic switch arranged in said holding circuit and adapted to be responsive to the temperature conditions maintaining in the motor, a second switch arranged in said holding circuit in parallel circuit relation with said thermostatic switch, a third switch arranged in said holding circuit in series circuit relation with said other two switches and means arranged to be responsive to the load upon the motor for opening said second switch when the load exceeds one value and to open said third switch when it exceeds another.

8. A motor control system comprising an electric motor, a source of current supply for said motor an electro-responsive circuit breaker for interrupting the current supply, means for closing said breaker, a circuit for holding the breaker closed, a thermostatic switch disposed in said holding circuit and arranged to be responsive to the temperature conditions maintaining in the motor, a second switch arranged in said holding circuit in shunt circuit relation with said thermostatic switch and means having a relatively small operating time lag arranged to respond to the load upon the motor and to operate said second switch whereby said thermostatic switch is prevented from opening said holding circuit when the load upon the motor is below a preselected value.

WILLIAM J. BRENNEN.